United States Patent [19]

Honma et al.

[11] Patent Number: 4,877,941
[45] Date of Patent: Oct. 31, 1989

[54] POWER SUPPLY SYSTEM FOR CONSUMABLE ELECTRODE ARC WELDING AND METHOD OF CONTROLLING THE SAME

[75] Inventors: Masahiro Honma, Kamakura; Maruyama Tokuji, Yokohama; Masashi Okada, Fujisawa; Yukio Hida, Kamakura, all of Japan

[73] Assignee: Kabushiki Kaisha Kobe Seiko Sho, Kobe, Japan

[21] Appl. No.: 192,622

[22] Filed: May 11, 1988

[30] Foreign Application Priority Data

| May 12, 1987 | [JP] | Japan | 62-113551 |
| Nov. 18, 1987 | [JP] | Japan | 62-289445 |
| Nov. 18, 1987 | [JP] | Japan | 62-289446 |
| Feb. 23, 1988 | [JP] | Japan | 63-38542 |

[51] Int. Cl.$^4$ ............................................. B23K 9/10
[52] U.S. Cl. ........................... 219/130.21; 219/137 PS
[58] Field of Search ............. 219/130.51, 137 PS, 219/130.4, 130.21

[56] References Cited

U.S. PATENT DOCUMENTS 3,382,345  5/1968  Normando .................. 219/130.4

FOREIGN PATENT DOCUMENTS 57-56165  4/1982  Japan .................. 219/130.51

Primary Examiner—Clifford C. Shaw
Attorney, Agent, or Firm—Oblon, Spivak, McClelland, Maier & Neustadt

[57] ABSTRACT

A power supply system for consumable electrode arc welding alternately switches between the reverse polarity and the straight polarity. The formation of an arc is detected. A polarity change control signal is generated when the arc duration reaches a predetermined time or when the quantity of charge reaches a predetermined value. The predetermined value of the welding current or voltage is reduced either immediately before or after the change in polarity.

3 Claims, 7 Drawing Sheets

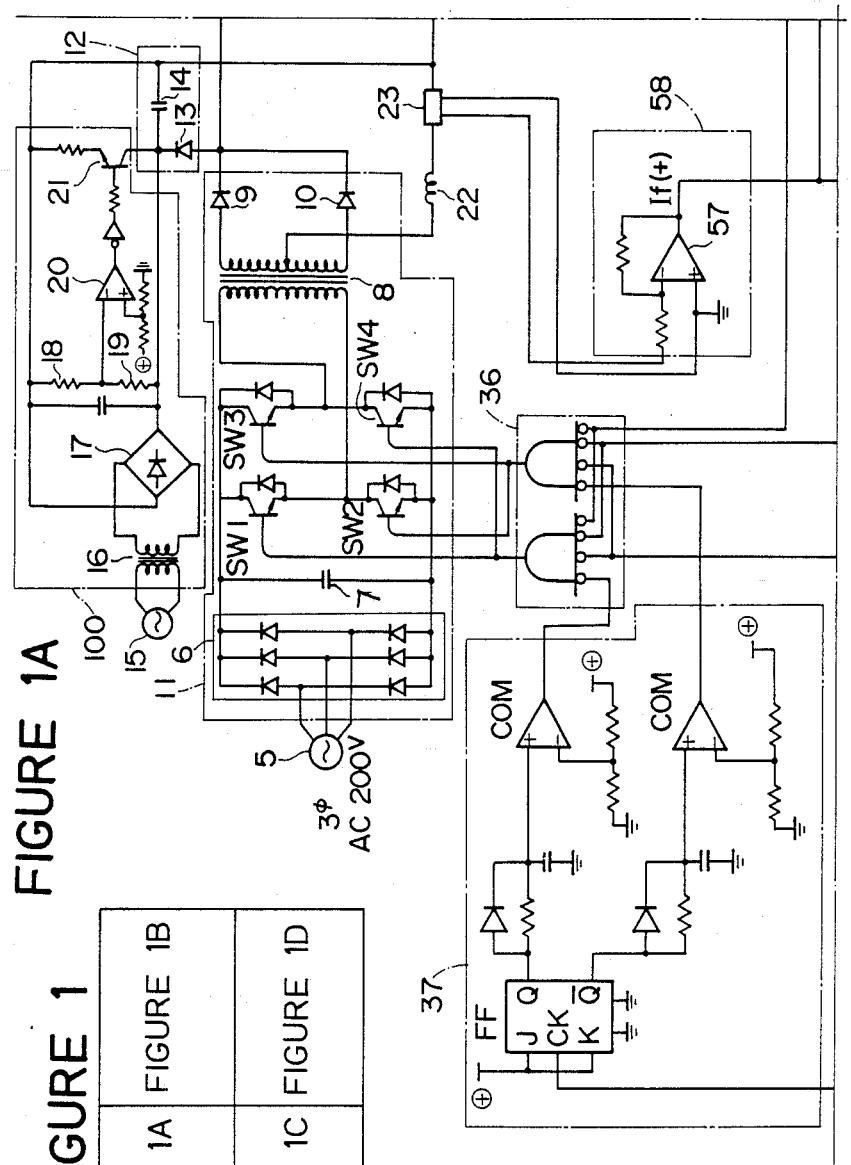

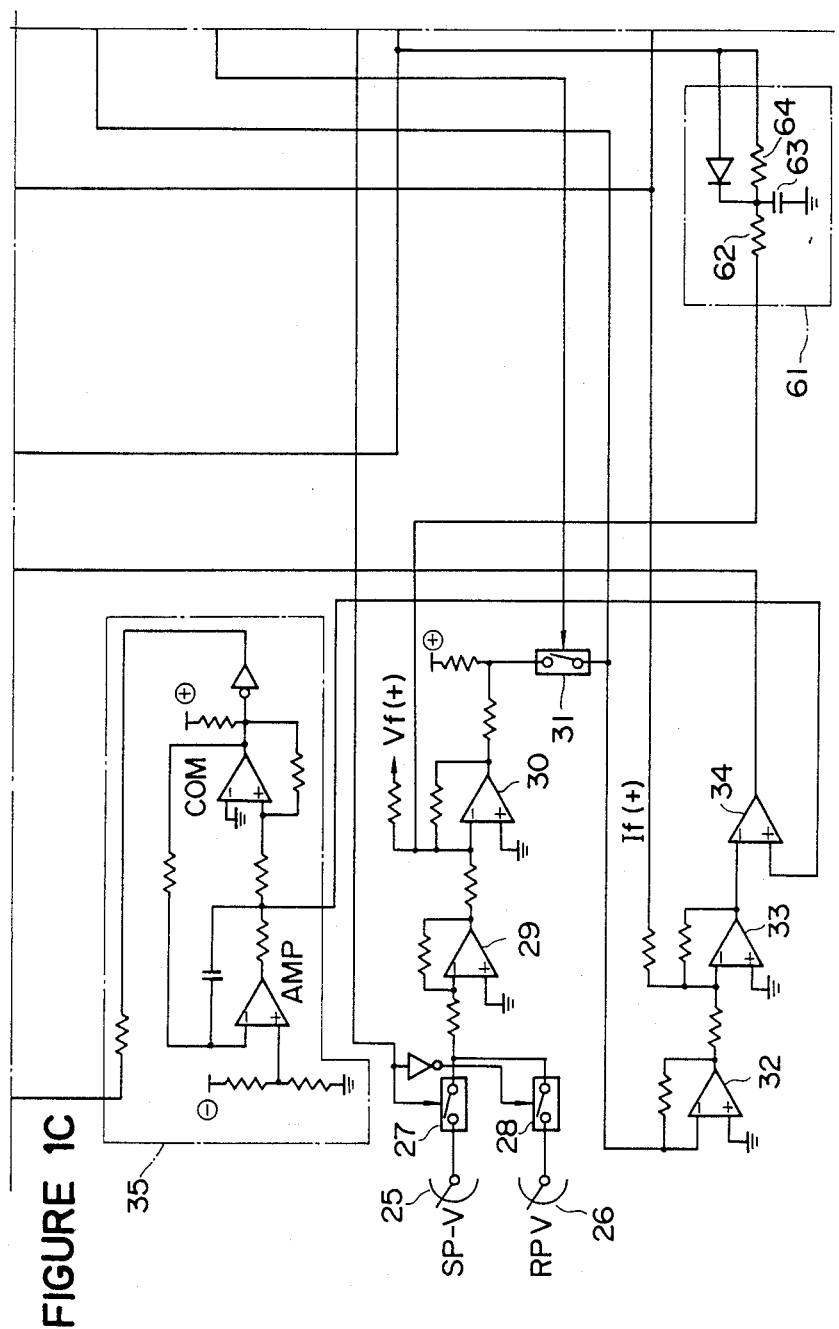

(a) S1, S2
(b) S3(SW)
(c) SA
(d) SB
(e) SW1,4
(f) SW2,3

(a) ARC VOLTAGE
(b) ARC CURRENT
(c) L1, L2
(d) S9
(e) S10
(f) S11
(g) S12
(h) S13

POWER SUPPLY SYSTEM FOR CONSUMABLE ELECTRODE ARC WELDING AND METHOD OF CONTROLLING THE SAME

BACKGROUND OF THE INVENTION

1. Field of the Invention

The present invention relates to a power supply system for consumable electrode arc welding wherein a consumable electrode is fed toward a base metal for arc welding and the polarity of a DC voltage applied across the consumable electrode and the base metal is alternately switched between the reverse polarity and the straight polarity, and to a method of controlling the power supply system.

2. Description of the Prior Art

Generally, the consumable electrode arc welding in which a consumable electrode (welding wire) is fed at a fixed speed for welding is reverse polarity welding, in which a DC voltage is applied across the consumable electrode and the base metal so that the polarity of the consumable electrode is positive and that of the base metal is negative.

Reverse polarity welding has advantages that the depth of penetration is large and flat beads are formed easily, because the heat input to the base metal is large. However, in welding thin base metals such as thin plates, burnthrough is liable to occur when the accuracy of the joint is low and a gap is formed between the base metals.

On the other hand, the straight polarity welding in which a DC voltage is applied across the consumable electrode and the base metal so that the polarity of the consumable electrode is negative and that of the base metal is positive is suitable for welding thin plates having a gap therebetween and requiring large reinforcement of weld, because the heat input to the base metal is small. However, straight polarity welding has problems that convex beads are liable to be formed when the accuracy of the joint is comparatively high and that lack of fusion is liable to occur depending on the shape of the joint when the welding wire is misaligned slightly with the joint.

U.S. Pat. No. 4,485,293 discloses a power source for consumable electrode AC arc welding, in which the welding mode is changed over alternately between the reverse polarity arc welding and the straight polarity arc welding to melt base metals in a desired depth of penetration to make most of the advantages of the reverse polarity welding and the straight polarity welding.

Generally, in consumable electrode arc welding employing the conventional arc welding power source, the arc is extinguished when the output voltage passes the zero point. The arc breaks off and reignition of arc is impossible when the open circuit output voltage is on the order of 80 V of the the conventional welding power source. Consequently, the arc stability is deteriorated remarkably and it is impossible to carry out stable welding.

In the short-circuiting arc welding process and power source disclosed in U.S. Pat. No. 4,485,293, the same polarity is maintained during an arc period and the polarity is changed over during a short-circuiting period to obviate unstable welding attributable to the extinction of the arc. Furthermore, this welding source is able to control the welding mode in an optional state between the reverse polarity arc welding and the straight polarity arc welding by varying the ratio between them on the basis of the frequency of short circuit and to control the heat input to the base metal and the melting rate of the welding wire.

However, since the opportunity to change over the polarity is limited only to the short-circuiting period in such a welding process, the polarity duration ratio between the reverse polarity arc welding and the straight polarity arc welding deviates greatly from a set polarity duration ratio when the short-circuiting period and the arcing period vary due to the vibration of the molten pool and the wire extension. Furthermore, the control of the polarity duration ratio between them is impossible in a high current range in which the frequency of short circuit is small.

SUMMARY OF THE INVENTION

Accordingly, it is an object of the present invention to provide a power supply system for consumable electrode arc welding capable of inverting the polarity during the arcing period to control the polarity duration ratio correctly at a desired ratio over a wide current range from the low current range to the high current range regardless of droplet transfer modes and securing stable consumable electrode arc welding.

It is another object of the present invention to provide a method of controlling such a power supply system for consumable electrode arc welding.

To achieve the objects of the invention, in a first aspect of the present invention, a power supply system for consumable electrode arc welding in which a DC voltage is applied across a base metal and a consumable electrode fed toward the base metal in alternate repetition of the reverse polarity and the straight polarity comprises:

(a) a DC power source for creating a DC voltage to be applied across the consumable electrode and the base metal;

(b) a reactor connected to the output of the DC power generator;

(c) an inverter circuit for changing the polarity of the DC voltage applied through the reactor across the consumable electrode and the base metal, comprising a plurality of switching elements and a first directional conductive element connected in parallel to the switching elements;

(d) a series circuit of a second directional conductive element and a capacitor, connected in parallel to the inverter circuit; and (e) a power circuit for applying a DC voltage to the capacitor of the series circuit.

In a second aspect of the present invention, a control circuit for controlling the inverter circuit comprises an arc detecting circuit for detecting arc formation between the consumable electrode and the base metal, and a polarity changeover control circuit which provides a polarity changeover signal upon the coincidence of arc duration determined by measuring the duration of the output signal of the arc detecting circuit with a predetermined time.

In a third aspect of the present invention, the control circuit in the second aspect for controlling the inverter circuit comprises an arc detecting circuit for detecting arc formation between the consumable electrode and the base metal, and a polarity changeover control circuit which provides a polarity changeover signal upon the coincidence of the quantity of charge obtained by integrating a welding current supplied to the consumable electrode during the continuation of the output signal of the arc detecting circuit with a predetermined value.

In a fourth aspect of the present invention, a method of controlling a power supply system for consumable electrode arc welding, in which the polarity of the DC voltage applied across a base metal and a consumable electrode fed toward the base metal is changed over repetitively and alternately between the reverse polarity and the straight polarity, is characterized by reducing the set value of at least either the welding current or the welding voltage at least either immediately before or immediately after changing over the polarity for a predetermined period in changing the polarity of the DC voltage applied across the base metal and the consumable electrode from the reverse polarity to the straight polarity.

In the power supply system for consumable electrode arc welding in the first aspect of the present invention, energy discharged from the reactor is absorbed by the capacitor connected in parallel to the inverter circuit in changing the polarity through the switching operation of the inverter circuit, the welding voltage is clamped at a voltage below the withstand voltage of the switching elements and above a voltage necessary for reignition of arc, and such a voltage is applied across the base metal and the consumable electrode. Consequently, the polarity can stably be inverted during the arcing period.

The power supply system in the second aspect of the present invention changes over the polarity on the basis of the ratio of the arc energy supplying time between the straight polarity and the reverse polarity. Accordingly, the polarity duration ratio between them is stable and hence a fine adjustment of the polarity duration ratio is possible.

The power supply system in the third aspect of the present invention changes over the polarity on the basis of arc energy ratio between the straight polarity and reverse polarity. Accordingly, arc energy ratio between them is correctly adjustable.

The method of controlling the power supply system, in the fourth aspect of the present invention reduces at least either the welding current or the welding voltage at least either immediately before or immediately after changing the polarity of the DC voltage applied across the base metal and the consumable electrode from the reverse polarity to the straight polarity. Accordingly, the flow of a welding current excessively high for the straight polarity arc welding immediately after the changeover of the polarity is obviated, and thereby the excessive burning of the consumable electrode (welding wire) and the abnormal growth of the droplets are suppressed and the reduction of the frequency of short circuit is prevented to avoid the deterioration of welding workability attributable to the changeover of the polarity.

BRIEF DESCRIPTION OF THE DRAWINGS

The above and other objects, features and advantages of the present invention will become apparent from the following description taken in conjunction with the accompany drawings, in which:

FIG. 1 and FIGS. 1A-1D is a circuit diagram of a power supply system for consumable electrode arc welding, in a preferred embodiment, according to the present invention;

DESCRIPTION OF THE PREFERRED EMBODIMENT

Figure 1B:
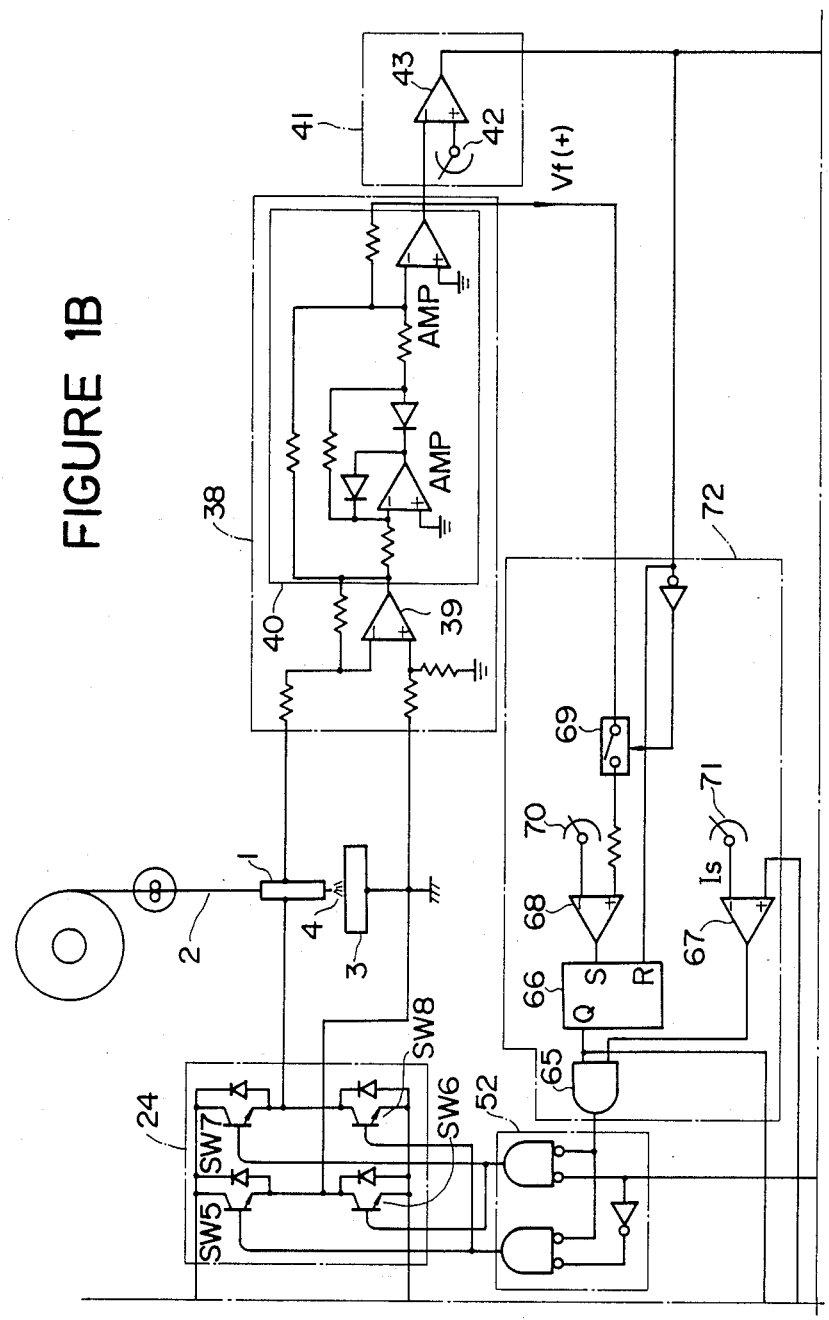
Figure 1D:
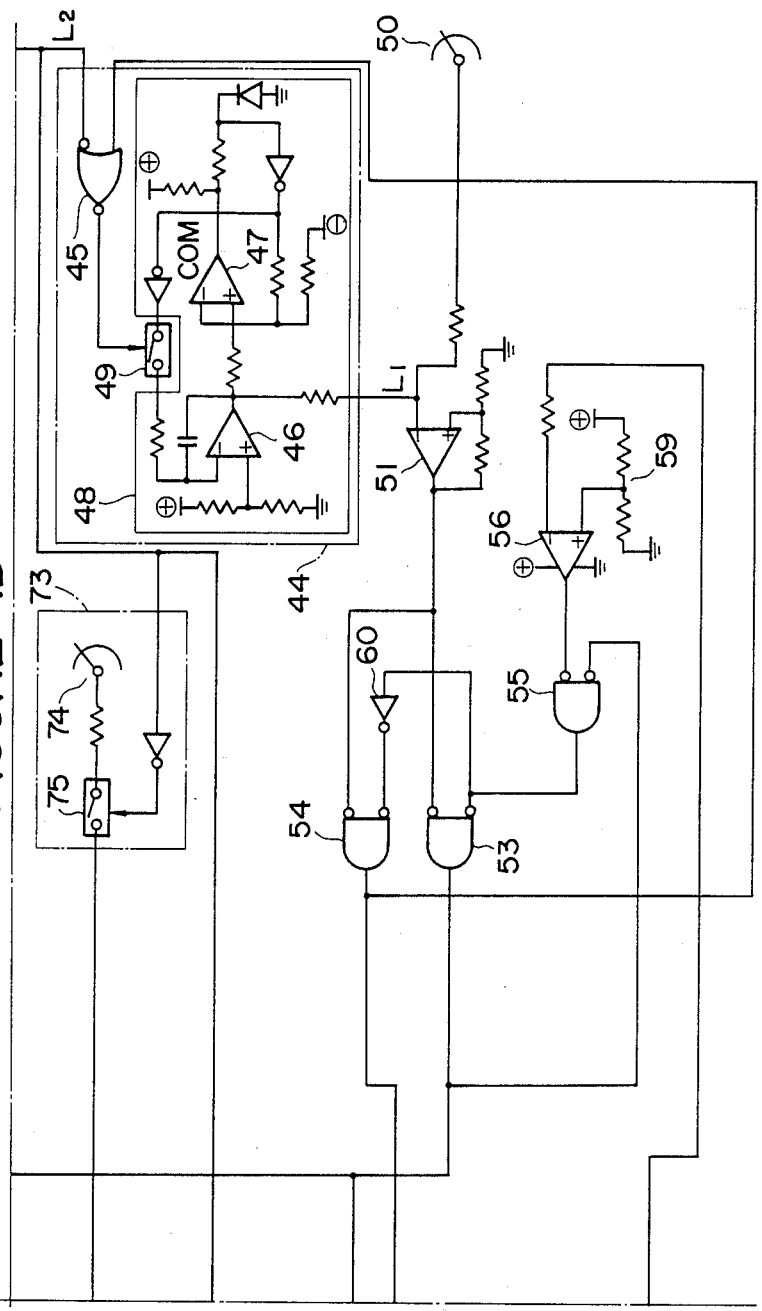

Referring now the drawings, wherein like reference numerals designate identical or corresponding parts throughout the several views, and more particularly to FIG. 1 which shows a power supply system embodying the present invention, including FIGS. 1A-1D. Indicated at 1 is a consumable electrode welding torch, at 2 is a consumable electrode which is fed at a predetermined wire feed rate by a consumable electrode feed device, not shown, and at 3 is a base metal.

First the main circuit of the power supply system will be described. A DC voltage is applied by a DC source 11 and an inverter circuit 24 across the consumable electrode 2 and the base metal 3 alternately in the reverse polarity and in the straight polarity to form an arc 4 therebetween to melt the continuously fed consumable electrode 2 for welding.

First the main circuit components of the power supply system will be described.

The DC source 11 for creating a DC voltage to be applied across the consumable electrode 2 and the base metal 3 is a DC source. The DC source 11 has a rectifier 6 comprising a diode bridge for rectifying a three-phase AC voltage supplied thereto by a commercial AC power source 5, and a smoothing capacitor 7 for smoothing the output of the rectifier 6 to create a DC voltage. Pairs of switching elements SW1 and SW4 and switching elements SW2 and SW3 are controlled and driven in combination to invert the output DC voltage of the rectifier 6 into a single-phase AC voltage, a transformer 8 reduces the single-phase AC voltage, and then diodes 9 and 10 rectify the single-phase AC voltage again to provide a DC voltage to be applied across the consumable electrode 2 and the base metal 3.

An energy absorbing circuit 12 is connected to the output of the DC source 11. The energy absorbing circuit 12 comprises a series circuit of a diode 13 (second directional conductive element) and a capacitor 14. A DC voltage created by raising the single-phase AC voltage of a commercial AC power source 15 to a desired voltage by a transformer 16 and rectifying the single-phase AC voltage by a rectifier (diode bridge) 17 is applied to the capacitor 14.

A transistor 21 connected in parallel to the capacitor 14 is turned ON or turned OFF according to the result of comparison of a voltage divided by resistors 18 and 19 and a set value by a comparator 20 to apply a predetermined voltage constantly across the capacitor 14. The voltage applied constantly across the capacitor 14 is lower than the withstand voltage of the switching element of an inverter circuit 24 and is high enough to enable reignition of the arc when the arc polarity changes over in various consumable electrode arc welding processes. It was found that smooth reignition of arc is possible when the voltage applied to the capacitor 14 is higher than 350V in the case of $CO_2$ gas shielded arc welding using the power supply system of the present invention The transformer 16, the rectifier (diode bridge) 17, the resistors 18 and 19, the comparator 20 and the transistor 21 constitute a power circuit 100. A reactor 22, a shunt 23 for detecting the output welding current, and the inverter circuit 24 are connected in that order in series to the DC source 11.

The inverter circuit 24 has pairs of switching elements SW5 and SW6 and switching elements SW7 and SW8, which are controlled and driven in combination to change over the polarity of the output DC voltage of the DC source 11 to apply the output DC voltage of the DC source 11 alternately in the reverse polarity and in the straight polarity across the consumable electrode 2 and the base metal 3. Flywheel diodes (first directional conductive elements) are connected respectively in parallel to the switching elements SW5, SW6, SW7 and SW8 of the inverter circuit 24 to recirculate energy generated by the switching operation of the switching elements SW5, SW6, SW7 and SW8.

Although the DC source 11 in this embodiment is provided with the main circuit of a full bridge inverter, the DC source 11 may be substituted by a DC source of a half bridge type or a chopper type for the same purpose.

Control circuits for controlling the main circuit will be described hereinafter.

DC Power Supply Control Circuit:

The DC source control circuit comprises a DC voltage regulator 25 of the straight polarity and a DC voltage regulator 26 of the reverse polarity. The DC voltage regulators 25 and 26 are connected respectively through analog switches 27 and 28 which are changed over by a polarity changeover signal to an amplifier 29. The amplifier 29 is provided with the set values of the DC voltage regulators 25 or 26. An amplifier 30 operates on the difference between the output of the amplifier 29 and a detected arc voltage across the consumable electrode 2 and the base metal 3.

An analog switch 31 which turns OFF when short circuit transition occurs during arcing is provided in a line interconnecting the amplifier 30 and an amplifier 32. An amplifier 33 operates on difference between the output of the amplifier 32 and a detected welding current and gives the result of operation to a comparator 34. A sawtooth signal generator 35 generates a sawtooth signal and gives the sawtooth signal to the comparator 34. A driver 36 turns ON or OFF the bridge inverter comprising the switching elements SW1, SW2, SW3 and SW4 on the basis of the output of the comparator 34, and a dividing circuit 37.

Inverter Circuit Control Circuit:

An arc voltage detecting circuit 38 detects the arc voltage across the consumable electrode 2 and the base metal 3. An amplifier 39 detects arc voltages of opposite polarities and applies the detected arc voltages to an absolute value circuit 40. The absolute value circuit 40 provides arc voltages of the same polarity.

A short-circuiting decision circuit 41 has a comparator 43 for comparing the output of the arc voltage detecting circuit 38 and a set value set by a setting device 42 and decides short-circuiting between the consumable electrode 2 and the base metal 3.

The short-circuiting decision circuit 41 and the arc voltage detecting circuit 38 constitute an arc detecting circuit.

The output of the short-circuiting decision circuit 41 is applied to the analog switch 31 of the control circuit for controlling the DC source 11 and to the logic IC 45 of a polarity ratio correcting circuit 44. The polarity ratio correcting circuit 44 comprises a ramp wave generator 48 having an integrating amplifier 46 and a comparator 47, the logic IC 45, and an analog switch 49 controlled by the logic IC 45. The output of the polarity ratio correcting circuit 44 and a polarity ratio setting device 50 are connected to a comparator 51. The output of the comparator 51 is applied to a logic IC 53 for controlling the driver 52 of the inverter circuit 24 and to a logic IC 54 for turning OFF the drivers 36 of the DC source 11. The logic IC 53 is driven by both the output of the comparator 51 and the output of a logic IC 55. The logic IC 55 is driven by the feedback output of the logic IC 53 and the output of a comparator 56. The comparator 56 compares the output of a welding current detecting circuit 58 for detecting the output of the DC source 11, i.e., the welding current, and a set current set by a setting device 59. The output of the welding current detecting circuit 58 is applied also to the amplifier 33 of the control circuit for controlling the DC source 11. The logic IC 54 is driven by the output of the comparator 51 and the output of an inverter 60 for inverting the output of the logic IC 55. The output of the logic IC 54 is applied to the logic IC 45 of the polarity ratio correcting circuit 44 and to a polarity changeover arc voltage correcting circuit 61. The polarity changeover arc voltage correcting circuit 61 comprises resistors 62 and 64, and a capacitor 63 for reducing the set value set by the straight polarity arc voltage setting device 25 after polarity changeover, and is connected to the amplifier 30 of the control circuit for controlling the DC source 11.

The polarity ratio correcting circuit 44, the polarity ratio setting device 50 and the comparator 51 constitute a polarity changeover control circuit. The inverter circuit 24 is controlled by the polarity changeover control circuit and is turned OFF by the output of the logic IC 65. The logic IC 65 is driven by the respective outputs of a R/S latch 66 and a comparator 67. The R/S latch 66 has a set terminal S connected to the output of a comparator 68, and a reset terminal R connected to the output of the short-circuiting decision circuit 41. The comparator 68 compares the output arc voltage of the arc voltage detecting circuit 38 which is provided when an analog switch 69 is turned ON by the output of the short-circuiting decision circuit 41, and a set arc voltage set by a setting device 70. The comparator 67 compares the detected welding current detected by the welding current detecting circuit 58, and a set welding current set by a setting device 71. All the drivers 36 of the DC source 11 are turned OFF by the output of the R/S latch 66.

These circuits relating to the operation of the logic IC 65 are designated as a neck control circuit 72.

The operation of the main circuit and the control circuits for controlling the main circuit in short-circuiting arc welding will be described hereinafter with reference to FIGS. 2(a) through 2(f).

Figure 2:
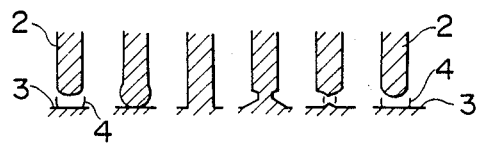
FIGS. 2(a) and 2(f) are illustrations respectively showing different stages of droplet transfer in consumable electrode short-circuiting arc welding.

Suppose that the switching elements SW6 and SW7 of the inverter circuit 24 are ON and a DC voltage is applied across the consumable electrode 2 and the base metal 3 in the reverse polarity, in which the consumable electrode 2 is positive and the base metal is negative, and short-circuiting arc welding shown in FIGS. 2(d) through 2(f) is repeated. In this state, the analog switch 28 of the control circuit for controlling the DC source 11 is ON and a set arc voltage of the reverse polarity set by the reverse polarity arc voltage setting device 26 is applied through the amplifier 29 to the amplifier 30.

The amplifier 30 operates the difference between the output of the amplifier 29 and the detected arc voltage detected by the arc voltage detecting circuit 38. Since the analog switch 31 is ON (FIG. 3(c)) during arcing (FIGS. 2(a), 2(e), 2(f)), the amplifier 32 decides a set welding current on the basis of the output of the amplifier 30. The amplifier 33 obtains the difference S1 (FIG. 4(a)) between the set welding current and the output of the welding current detecting circuit 58 and applies the difference S1 to the comparator 34. The comparator 34 compares the output signal S1 of the amplifier 33 and the output sawtooth signal S2 (FIG. 4(a)) of the sawtooth generating circuit 35. The driver 36 drives the combination of the switching element SW1 and SW4 and the combination of the switching elements SW2 and SW3 on the basis of the output signal S3 (FIG. 4(b)) of the comparator 34 and the output signals SA and SB (FIGS. 4(c), 4(d)) of the dividing circuit 37.

Figure 3:
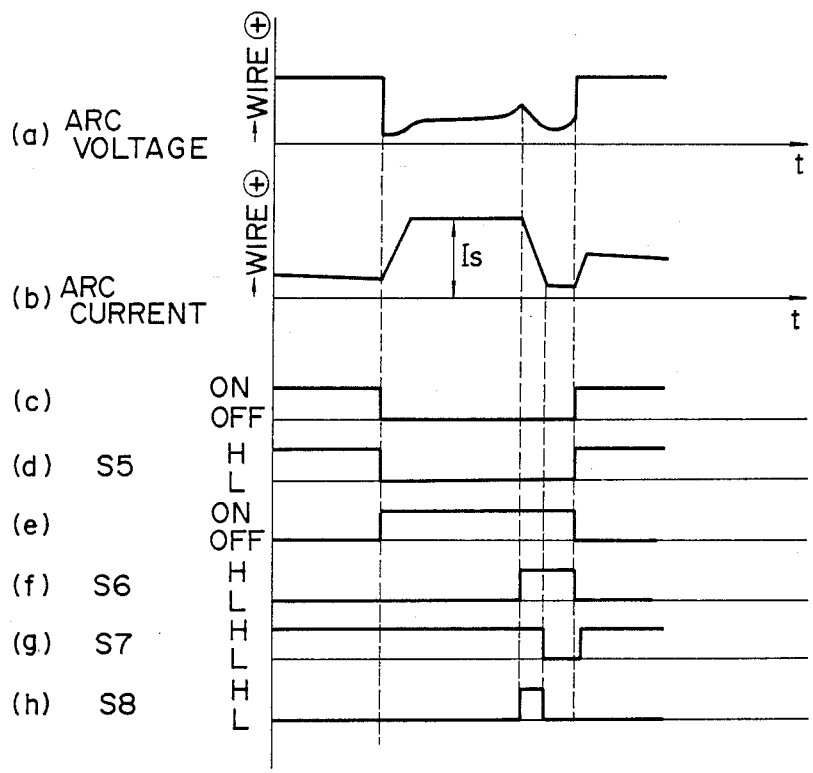
FIGS. 3(a) and 3(b) are charts respectively showing the wave forms of welding voltage and welding current under control by the power supply system of FIG. 1.
FIGS. 3(c) through 3(h) are charts respectively showing the output signals of the essential parts of the control circuit of the power supply system of FIG. 1.
Figure 4:
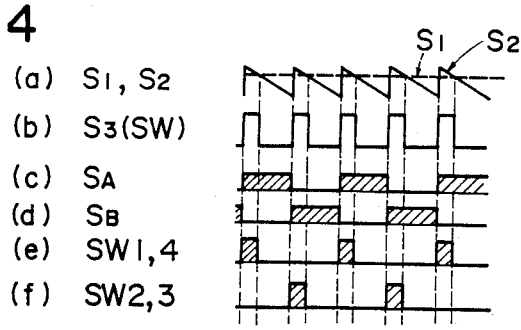
FIGS. 4(a) through 4(f) are charts respectively showing the output signals of the essential parts of the control circuit of the power supply system of FIG. 1.

Upon the contact of a droplet formed at the free end of the consumable electrode 2 with the base metal 3 for short-circuiting (FIGS. 2(b), 2(c)), the arc voltage drops, the output of the arc voltage detecting circuit 38 diminishes and thereby the output signal S5 (FIG. 3(d)) of the short-circuiting decision circuit 41 goes LOW.

The output signal S5 of the short-circuiting decision circuit 41 turns OFF the analog switch 31 (FIG. 3(c)) and cuts off the output of the amplifier 30. At the same time, the analog switch 69 of the neck control circuit 72, and the analog switch 75 of the fixed short circuit current setting circuit 73 are turned ON (FIG. 3(e)), and then a set value set by the setting device 74 of the fixed short circuit current setting circuit 73 is applied to the amplifier 32 for setting welding current.

The amplifier 33 operates a set welding current set by the amplifier 32 and the output of the welding current detecting circuit 58, namely, a detected welding current, to provide the difference between the set welding current and the detected welding current to the comparator 34. The switching elements SW1, SW2, SW3 and SW4 are driven by the output of the comparator 34 so that a fixed short circuit current Is (FIG. 3(b)) is supplied continuously to the consumable electrode 2.

In this period where the fixed short circuit current Is is supplied to the consumable electrode 2, the output of the logic IC 45 of the polarity ratio correcting circuit 44 is LOW by the output signal S5 (FIG. 3(d)) of the short-circuiting decision circuit 41, and the analog switch 49 is OFF to fix the output of the polarity ratio correcting circuit 44. Therefore, the short-circuiting period is excluded from the arc energy supplying time for polarity changeover. As the short circuit current Is is supplied continuously to the consumable electrode 2, a neck is formed in the extremity of the consumable electrode 2 by the pinch effect of the short circuit current as shown in FIG. 2(d). In this state, the output of the arc voltage detecting circuit 38, namely, a detected arc voltage, exceeds a set arc voltage set by the setting device 0 of the neck control circuit 72 and hence the output of the comparator 68 goes HIGH, and the output signal S6 (FIG. 3(f)) of the R/S latch 66 applied to the driver 36 goes HIGH to turn OFF all the switching elements of the DC source 11. On the other hand, the output signal S7 (FIG. 3(g)) of the comparator 67 is HIGH and hence the output signal S8 (FIG. 3(h)) of the logic IC 65 goes HIGH. Consequently, all the outputs of the driver 52 are turned OFF, and thereby all the switching elements of the inverter circuit 24 turned off. Then, the welding current flows through the flywheel diodes connected in parallel respectively to the switching elements SW5 and SW8 and through the diode 13 into the capacitor 14 of the energy absorbing circuit 12 and the current flowing through the reactor 22 also turns to flow into the capacitor 14 of the energy absorbing circuit 12, and thereby the welding current decreases rapidly. Then, the current flowing through the reactor 22 decreases to a value below a set value set by the setting device 71 of the comparator 67 of the neck control circuit 72, and thereby the output signal S7 (FIG. 3(g)) of the comparator 67 goes LOW and this signal S7 is applied to the logic IC 65. Then, the output signal S8 (FIG. 3(h)) of the logic IC 65 goes LOW and the driver 52 drives the switching elements SW6 and SW7 again. The current flowing through the reactor 22 turns to flow through the switching elements SW6 and SW7 of the inverter circuit 24 across the consumable electrode 2 and the base metal 3. Consequently the rate of decrease of the welding current is reduced. Thus, the least necessary current for forming an arc is secured. An arc is formed again after a droplet of the end of the consumable electrode 2 has been transferred perfectly to the base metal 3.

Then, the output of the arc voltage detecting circuit 38 increases and the output signal S5 (FIG. 3(d)) of the short-circuiting decision circuit 41 goes HIGH. Then, the analog switch 31 is turned ON (FIG. 3(c)) to apply the output of the amplifier 30 again to the amplifier 32 and, at the same time, the analog switch 69 of the neck control circuit 72 is turned OFF (FIG. 3(e)) to make the output of the comparator 68 LOW, and thereby the output signal S6 (FIG. 3(f)) of the R/S latch 66 goes LOW. Consequently, the driver 36 of the DC source 11 is turned ON again.

On the other hand, the output signal S5 of HIGH of the short-circuiting decision circuit 41 turns OFF the analog switch 75 of the fixed short circuit current setting circuit 73 (FIG. 3(e)) to cut off the set value set by the setting device 74 and turns ON the analog switch 31 (FIG. 3(c)), thereby the arc voltage and the arc current as shown in FIGS. 3(a) and 3(b) are controlled to continue welding.

Figure 5:
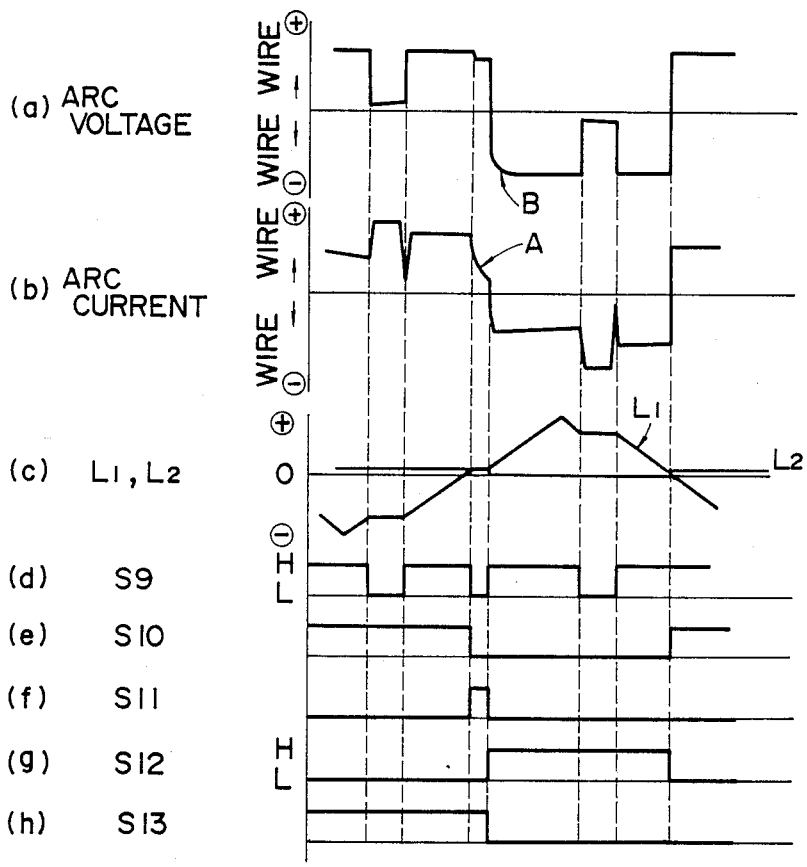
FIGS. 5(a) and 5(b) are charts respectively showing the wave forms of arc voltage and arc current controlled for changing the polarity by the power supply system of FIG. 1.
FIGS. 5(c) through 5(h) are charts respectively showing the output signals of the control circuit of the power supply system of FIG. 1 in changing the polarity.

During short-circuiting period, the output of the short-circuiting decision circuit 41 is LOW and hence the output signal S9 (FIG. 5(d)) of the logic IC 45 is LOW. Therefore, the analog switch 49 is turned OFF to fix the output of the integrating amplifier 46. That is, the integrating amplifier 46 does not perform integration during the period of short-circuiting. While the short-circuiting decision circuit 41 provides an output signal of HIGH, the input level $L_1$ (FIG. 5(c)) of the comparator 51 varies along a ramp wave generated by the ramp wave generating circuit 48 and hence a period in which an arc is formed between the consumable electrode 2 and the base metal 3 is timed. When the input level $L_1$ becomes high in comparison to the input level $L_2$ (FIG. 5(c)), the output signal S10 (FIG. 5(e)) of the comparator 51 goes LOW. When the output signal S10 of LOW is applied to one of the inputs of the logic IC 54 and a signal of LOW is applied to the other input of the logic IC 54, the logic IC provides an output signal S11 of HIGH (FIG. 5(f)), and thereby all the drivers 36 of the DC source 11 is turned OFF to decrease the welding current supplied by the DC source 11 and, at the same time, the amplifier 30 decreases the set arc voltage by using the arc voltage decreasing resistance 62 of the polarity changeover arc voltage correcting circuit 61.

On the other hand, the output signal of HIGH (FIG. 5(f)) of the logic IC 54 is applied to the logic IC 45 of the polarity ratio correcting circuit 44. However, since the changeover is performed during arcing, the output S9 (FIG. 5(d)) of the logic IC 45 goes LOW to turn OFF the analog switch 49, consequently, error in the polarity ratio is reduced.

The output signal S10 (FIG. 5(e)) of HIGH of the comparator 51 is applied also to one of the inputs of the logic IC 53. While a signal of HIGH is applied to the other input of the logic IC 53, the output signal S12 (FIG. 5(g)) of the logic IC 53 remains low irrespective of the output signal S10.

Meanwhile, the welding current supplied by the DC source 11 continues to decrease. The decrease of the welding current is detected by the welding current detecting circuit 58. When the detected welding current decreases below a set welding current set by the setting device 59, namely, a welding current effective for preventing the abnormal growth of droplets in changing the polarity from the reverse polarity to the straight polarity, the output of the comparator 56 goes HIGH. The output of HIGH of the comparator 56 is applied to the logic IC 55, and then the output signal S13 (FIG. 5(h)) of the logic IC 55 goes LOW, the input signal of the logic IC 53 goes LOW and the output signal S12 (FIG. 5(g)) of the logic IC 53 goes HIGH. Then, the driver 52 of the inverter circuit 24 turns ON the switching elements SW5 and SW8, and at the same time turns OFF the switching elements SW6 and SW7. At this moment, the welding current flowing through the consumable electrode 2 turns to flow through the flywheel diodes connected to the switching elements SW5 and SW8 through the diode 13 into the capacitor 14 of the energy absorbing circuit 12, so that the welding current is decreased to zero in an instant, and almost the same voltage as that of the voltage of the capacitor 14 is applied across the consumable electrode 2 and the base metal 3 only while the current through the reactor 22 is flowing into the capacitor 14. An arc is ignited again by the voltage applied across the consumable electrode 2 and the base metal 3 for the straight polarity welding, in which the consumable electrode 2 is negative and the base metal 3 is positive. Thus, almost the same voltage as that of the capacitor 14 is applied to reignite an arc just after the arc is extinguished once for changing over the polarity and to prevent the voltage for reigniting an arc from exceeding the withstand voltage of the switching elements of the inverter circuit 24 in changing over the polarity.

On the other hand, the output signal S11 (FIG. 5(f)) of LOW of the logic IC 54 is applied to the driver 36 of the DC source 11 to drive the driver 36 again. The arc voltage is increased gradually in a time constant defined by the capacitor 63 and resistor 64 of the polarity changeover arc voltage correcting circuit 61. The purpose of the control of this arc voltage setting is to prevent the abnormal growth of droplets in cooperation with the decrease of the set welding current immediately before polarity changeover. The output signal S11 of LOW of the logic IC 54 is applied also to the polarity ratio correcting circuit 44 to start timing the arcing time.

The output signal S12 of HIGH of the logic IC 53 turns ON the analog switch 27 to change the reverse polarity DC voltage regulator 26 for the straight polarity DC voltage regulator 25. The straight polarity welding is controlled, similarly to the reverse polarity welding, on the basis of a set value set by the straight polarity DC voltage regulator 25.

Thereafter, when the input level $L_1$ (FIG. 5(c)) becomes LOW in comparison to the input level $L_2$ (FIG. 5(c)) of the comparator 51, by measuring the duration of the output of the arc detecting circuit, the output signal S10 (FIG. 5(e)) of the comparator 51 goes HIGH and the output of the logic IC 53 goes LOW. Consequently, the driver 52 of the inverter circuit 24 turns OFF the switching elements SW5 and SW8 and turns ON the switching elements SW6 and SW7 to change over the polarity from the straight polarity to the reverse polarity. At the same time, the straight polarity DC voltage regulator 25 is changed for the reverse polarity DC voltage regulator 26.

In this embodiment, the welding current is decreased immediately before the polarity changeover and the welding voltage is decreased immediately after the polarity changeover in changing the polarity from the reverse polarity to the straight polarity. A high welding current will cause the abnormal growth of droplets unless the welding current or the welding voltage are controlled in such a manner.

Furthermore, the temperature of a droplet growing large drops during short-circuiting transfer decreases, so the viscosity of the droplet increases to impede the short-circuiting transfer of the droplet, so that an increased time is necessary for necking the free end of the consumable electrode and, in some cases, the unmolten welding wire is stubbed into the molten pool, an unsatisfactory irregular bead having necks is formed or an intermittent bead is formed. Since the arcing period and the short-circuiting period are thus extended, the frequency of short circuit is reduced or varies over a wide range to deteriorate the stability of welding. Still further, the excessive growth of the droplet entails increase in size and amount of spatters.

Means for suppressing the growth of the droplet in changing from the reverse polarity to the straight polarity varies according to occasions. For example, when only the reverse polarity welding current is decreased immediately before changing over the polarity, the polarity changeover arc voltage correcting circuit 61 may be omitted. When only the straight polarity welding current is decreased immediately after changing over the polarity, a differentiating circuit may be connected to the output of the logic IC 53 which provides a polarity changeover signal and the output of the differentiating circuit may be applied to the amplifier 32 of the control circuit which decides the output welding current of the DC source 11.

The results of a welding operation using the power supply systems of FIG. 1 provided with a modification for suppressing the growth of droplets in changing from the reverse polarity for the straight polarity will be described hereinafter.

(1) Welding Current Decreasing Control Immediately before Polarity Changeover:

Welding conditions: base metal: 1.2 mm thick plate, joint: horizontal lap joint, gap: 0.4 mm, shielding gas: $CO_2$, diameter of welding wire: 1.2 mm, wire feed rate: 4 m/min, welding speed: 0.8 m/min, polarity ratio (straight polarity ratio): 60%, polarity changeover frequency: 50 Hz.

Droplets grew excessively, the arc was unstable and excessive sputtering occurred to deteriorate the stability of welding unless the welding current or the welding voltage was controlled. The short circuit frequency was as small as 15 to 25 times/sec. When the waveform was decreased immediately before polarity changeover, the growth of droplets was suppressed, the frequency of short circuit increased to a level on the order of 60 times/sec and the arc was stabilized.

(2) Welding Voltage Decreasing Control Immediately after Polarity Changeover:

Welding conditions: base metal: 1.2 mm thick plate, joint: horizontal lap joint, gap: 0.4 mm, diameter of welding wire: 1.2 mm, shielding gas: $CO_2$, wire feed rate: 6 m/min, welding speed: 1.2 m/min, polarity ratio: 50%, polarity changeover frequency: 100 Hz.

Unless the welding current or the welding voltage was controlled, droplets grew excessively, the arc was unstable and excessive spattering occurred to deteriorate the stability of welding, and an excessively narrow bead was formed. The short circuit frequency was about 20 times/sec. The growth of droplets was suppressed, short circuit frequency increased to 50 times/sec, the arc was stabilized and a satisfactory continuous bead was formed when the welding voltage was decreased immediately after polarity changeover.

(3) Welding Current Decreasing Control Immediately before Polarity Changeover and Welding Voltage Decreasing Control Immediately after Polarity Changeover:

Welding conditions: base metal: 1.6 mm thick plate, joint: horizontal lap joint, gap: 0.5 mm, diameter of welding wire: 1.2 mm, shielding gas: $CO_2$, wire feed rate: 9.5 m/min, welding speed: 1.5 m/min, polarity ratio: 70%, polarity changeover frequency: 300 Hz.

Unless the welding current and the welding voltage were controlled, droplets grew excessively, the arc was unstable, a lot of large spatter was occurred, the bead was intermittent or necked and stubbing occurred. Short-circuiting period frequency was about 10 times/sec. When the welding current and voltage were decreased according to the present invention as indicated by A in FIG. 5(b) and indicated by B in FIG. 5(a), the growth of droplets was suppressed, short circuit frequency was in the range of 40 to 45 times/sec, the arc was stabilized, large spatters were reduced and stable and a continuous bead was formed.

Although the effects of the present invention have been explained above with reference to $CO_2$ gas shielded AC arc welding using a solid wire, the same effects can be obtained with Ar-$CO_2$-mixed gas shielded AC arc welding and self-shielded AC arc welding using a flux-cored wire.

In the foregoing description of the embodiment of the present invention, arcing periods other than periods of short circuit between the consumable electrode 2 and the base metal 3 is used as a parameter of the polarity ratio. The more desirable method is as follows. Namely, the polarity is changed over when the quantity of charge obtained by integrating the arc current reaches a predetermined value. The quantity of electric charge is an optimum parameter of arc energy directly contributing to melting the base metal 3. Accordingly, the polarity ratio is further stabilized regardless of the vibration of the molten pool, the variation of welding speed and the variation of wire extension, and the variation of arcing periods and welding current, and hence the polarity ratio never deviates greatly from the set polarity ratio.

Figure 6:
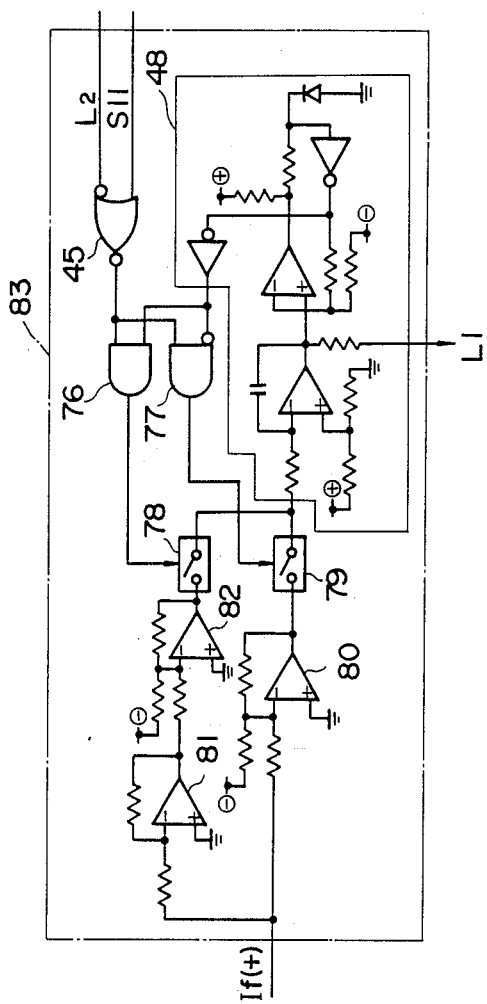
FIG. 6 is a circuit diagram of a control circuit which employs the quantity of charge supplied during arcing periods as a parameter for changing the polarity.

The quantity of electric charge may be substituted by the electric power or the integration of the square of welding current. FIG. 6 shows a modification of the polarity ratio correcting circuit 44 of FIG. 1, using the quantity of electric charge in the arcing period as a parameter for the polarity ratio. The polarity ratio correcting circuit 83 shown in FIG. 6 has two logic ICs 76 and 77 connected to the output of the logic IC 45, and two analog switches 78 and 79 connected respectively to the respective outputs of the logic ICs 76 and 77, instead of the analog switch 49 of the polarity ratio correcting circuit 44. An amplifier 80 for inverting and amplifying the output of the welding current detecting circuit 58 of FIG. 1 is connected to the analog switch 79, and a series connection of amplifiers 81 and 82 for amplifying the output of the welding current detecting circuit 58 is connected to the analog switch 78.

In the operation of the polarity ratio correcting circuit 83, the logic IC 45 provides an output signal of LOW during the consumable electrode 2 and the base metal 3 are short-circuited or during a polarity changeover period, and thereby both the logic IC 76 and 77 provides output signals of LOW to turn OFF the analog switches 78 and 79. In this state, the output of the polarity ratio correcting circuit 83 is fixed and hence the quantity of electric charge in periods other than arcing periods is not integrated.

When the logic IC 45 provides an output signal of HIGH, the logic IC 76 or 77 provides an output signal of HIGH and thereby the analog switch 78 or 79 corresponding to the logic IC 76 or 77 is turned ON, so that the polarity ratio correcting circuit 83 receives a detection signal If(+) provided by the welding current detecting circuit 58 as a value corresponding to ramp wave generating and thereby the polarity ratio correcting circuit 83 integrates the quantity of electric charge.

This polarity ratio correcting circuit 83 may be replaced by any suitable means capable of obtaining the quantity of electric charge by integrating the detected welding current in periods other than periods in which the consumable electrode 2 and the base metal 3 are short-circuited.

The component circuits of the power supply system shown in FIG. 1 may be replaced respectively by any equivalent circuits within the scope of the present invention. For example, the diodes serving as the first and second directional conductive elements may be replaced by thyristors having gates which are ON constantly for single-directional conduction, or by circuits having bidirectional conductive elements and designed to As apparent from the foregoing description, the power supply system of the present invention for consumable electrode arc welding and the method of controlling such a power supply system provides the following effects.

A voltage which will not damage the switching elements and enables reignition of an arc is applied across the consumable electrode and the base metal, so that the inversion of the polarity can stably and easily be achieved in an arcing period, the stability of welding can be enhanced and welding efficiency can be improved.

The energy discharged from the reactor can be used for reigniting an arc and hence the DC source need not have a particularly high open circuit voltage and may be a high voltage source having a small output capacity.

The polarity ratio can accurately be controlled at a desired ratio over a wide welding current range from a low current to a high current regardless of the droplet transfer mode of the consumable electrode, which expands the field of application of gas-shielded arc welding.

Since the control circuit for controlling the inverter circuit comprises an arcing detecting circuit for detecting arcing periods for detecting arcing periods, namely, periods other than periods in which the consumable electrode and the base metal are short-circuited, and a polarity changeover control circuit which provides a polarity changeover signal upon the coincidence of an measured time during arcing period with a predetermined value, the polarity changeover is performed on the basis of the ratio of arc energy supplying time between the straight polarity welding and the reverse polarity welding instead of the ratio of short circuit frequency between them. Accordingly, the polarity ratio is stabilized and can be regulated finely, so that the variation of heat input is prevented and heat input can be precisely controlled and thereby the weld quality is improved as compared with the conventional weld quality. Furthermore, since the polarity changeover is performed on the basis of the ratio of arc energy between the straight polarity welding and the reverse polarity welding, the polarity ratio is further stabilized and can be regulated finely, so that the variation of heat input is prevented and heat input can be precisely controlled and thereby the weld quality is improved remarkably as compared with the conventional weld quality.

Since at least the set value of either the welding current or the welding voltage is decreased at least immediately before or immediately after polarity changeover in changing the polarity of the DC welding voltage from the reverse polarity to the straight polarity, the excessive burning of the consumable electrode and the abnormal growth of droplets are suppressed. Consequently, reduction in short circuit frequency and variation of short circuit frequency are prevented, a stable arc is formed, and high-speed welding is possible. Thus, the deterioration of the stability of welding attributable to polarity changeover is prevented and utmost consumable electrode AC arc welding is achieved.

What is claimed is:

1. A power supply system for consumable electrode arc welding in which a DC welding voltage is applied alternately in the straight polarity and in the reverse polarity across a base metal and a consumable electrode being fed toward the base metal, said power supply system comprising:
    (a) a DC source for generating a DC voltage to be applied across the base metal and the consumable electrode;
    (b) a reactor connected to the output of the DC source;
    (c) an inverter circuit connected through the reactor to the DC source and comprising a plurality of switching elements for changing over the polarity of the DC voltage applied across the base metal and the consumable electrode, and first directional conductive elements respectively connected in parallel to the switching elements;
    (d) an energy absorbing circuit including a series connection of a second directional conductive element and a capacitor, connected in parallel to the input of said inverter circuit; and
    (e) a power supply circuit for applying a DC voltage to the capacitor.

2. A power supply system for consumable electrode arc welding according to claim 1, further comprising an inverter control circuit for controlling said inverter circuit, comprising: an arc detecting circuit for detecting arcing periods, which are periods other than short-circuit periods in which the base metal and the consumable electrode are short-circuited; and a polarity changeover control circuit connected to said arc detecting circuit which provides a plurality changeover signal upon the coincidence of arc duration, determined by measuring the duration of the output signal of the arc detecting circuit, with a predetermined value and having an output which controls said inverter circuit.

3. A power supply system for consumable electrode arc welding according to claim 1, further comprising an inverter control circuit for controlling said inverter circuit, comprising: an arc detecting circuit which detects arcing periods, which are, periods other than periods in which the base metal and the consumable electrode are short-circuited; and a polarity changeover control circuit connected to said arc detecting circuit which provides a polarity changeover signal upon the coincidence of a quantity of electric charge determined by integrating the welding current supplied to the consumable electrode during the continuation of the output signal of the arc detecting circuit, with a predetermined value and having an output which controls said inverter circuit.

* * * * *